United States Patent
Ishikawa (10) Patent No.: US 9,903,459 B2
(45) Date of Patent: Feb. 27, 2018

(54) STRAIN WAVE GEARING HAVING CONTINUOUS-CONTACT TOOTH PROFILE FORMED USING ARCUATE TOOTH PROFILE

(71) Applicant: Harmonic Drive Systems Inc., Shinagawa-ku, Tokyo (JP)

(72) Inventor: Shoichi Ishikawa, Yokohama (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/892,047

(22) PCT Filed: Jul. 11, 2014

(86) PCT No.: PCT/JP2014/068585
§ 371 (c)(1),
(2) Date: Nov. 18, 2015

(87) PCT Pub. No.: WO2016/006102
PCT Pub. Date: Jan. 14, 2016

(65) Prior Publication Data
US 2017/0159789 A1   Jun. 8, 2017

(51) Int. Cl.
*F16H 35/00* (2006.01)
*F16H 49/00* (2006.01)
*F16H 55/08* (2006.01)

(52) U.S. Cl.
CPC ......... *F16H 49/001* (2013.01); *F16H 55/08* (2013.01); *F16H 55/0833* (2013.01); *F16H 2049/003* (2013.01)

(58) Field of Classification Search
CPC .................................................. F16H 49/001
(Continued)

(56) References Cited

U.S. PATENT DOCUMENTS 2,906,143 A    9/1959 Musser
3,996,816 A *  12/1976 Brighton ............... F16H 49/001
                                                74/462
(Continued)

FOREIGN PATENT DOCUMENTS

JP     45-41171      12/1970
JP     63-115943 A    5/1988
(Continued)

OTHER PUBLICATIONS

International Search Report (PCT/ISA/210) dated Sep. 30, 2014, by the Japanese Patent Office as the International Searching Authority for International Application No. PCT/JP2014/068585.
(Continued)

*Primary Examiner* — Ha Dinh Ho
(74) *Attorney, Agent, or Firm* — Buchanan Ingersoll & Rooney PC (57) ABSTRACT

A strain wave gearing includes a rigid internally toothed gear, a flexible externally toothed gear disposed coaxially within the internally toothed gear, and a wave generator fitted within the externally toothed gear. The internally toothed gear and the externally toothed gear are spur gears having module m; and the number of teeth of the externally toothed gear is 2n less than the number of teeth of the internally toothed gear, where n is a positive integer. Taking a transverse cross-section at a prescribed position along a tooth trace direction of the external teeth as a main cross-section, a degree of flexing, with respect to a rim-neutral circle of the externally toothed gear prior to ellipsoidal flexing, of a rim-neutral line of the ellipsoidally flexed externally toothed gear is set, at a position on the major axis in the main cross-section, to 2mn.

10 Claims, 8 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 4,051,745 | A | * | 10/1977 | Ishikawa ............. F16H 55/0826 74/462 |
| 4,703,670 | A | * | 11/1987 | Kondo .................. F16H 49/001 74/461 |
| 4,823,638 | A | | 4/1989 | Ishikawa |
| 4,974,470 | A | | 12/1990 | Ishikawa et al. |
| 6,964,210 | B2 | * | 11/2005 | Colbourne .............. B23F 15/00 407/20 |
| 8,381,608 | B2 | * | 2/2013 | Okamoto ............ F16H 55/0806 74/460 |
| 2007/0022838 | A1 | | 2/2007 | Ishikawa |
| 2007/0180947 | A1 | | 8/2007 | Ishikawa et al. |
| 2008/0060466 | A1 | | 3/2008 | Ishikawa |
| 2011/0154928 | A1 | | 6/2011 | Ishikawa |

FOREIGN PATENT DOCUMENTS

| | | |
|---|---|---|
| JP | 64-79448 A | 3/1989 |
| JP | 2007-211907 A | 8/2007 |
| WO | WO 2005/043006 A1 | 5/2005 |
| WO | WO 2005/121597 A1 | 12/2005 |
| WO | WO 2010/023710 A1 | 3/2010 |
| WO | WO 2010/070712 A1 | 6/2010 |
| WO | WO 2013/046274 A1 | 4/2013 |
| WO | WO 2013/105127 A1 | 7/2013 |

OTHER PUBLICATIONS

Written Opinion (PCT/ISA/237) dated Sep. 30, 2014, by the Japanese Patent Office as the International Searching Authority for International Application No. PCT/JP2014/068585.

* cited by examiner

STRAIN WAVE GEARING HAVING CONTINUOUS-CONTACT TOOTH PROFILE FORMED USING ARCUATE TOOTH PROFILE

TECHNICAL FIELD

The present invention relates to an improvement of the tooth profiles of a rigid internally toothed gear and a flexible externally toothed gear in a strain wave gearing. Specifically, the present invention relates to a flat strain wave gearing having a continuous-contact tooth profile formed using an arcuate tooth profile so that the two gears mesh continuously in each transverse cross-section along the tooth trace direction. In addition, the present invention relates to a cup-shaped or top-hat-shaped strain wave gearing having a three-dimensional continuous-contact tooth profile formed using an arcuate tooth profile so that the two gears mesh continuously in each transverse cross-section along the tooth trace direction and also mesh continuously across the entire tooth trace direction.

BACKGROUND ART

Typically, a strain wave gearing has a rigid internally toothed gear, a flexible externally toothed gear disposed coaxially within the internally toothed gear, and a wave generator fitted within the externally toothed gear. A flat strain wave gearing comprises an externally toothed gear having a flexible cylindrical outer-peripheral surface on which external teeth are formed. The flexible externally toothed gear of a cup-shaped or top-hat-shaped strain wave gearing comprises a flexible cylindrical barrel part, a diaphragm extending radially from the trailing end of the cylindrical barrel part, and external teeth formed on the outer-peripheral surface portion of the cylindrical barrel part on the side facing the leading end opening. In a traditional strain wave gearing, the circular flexible externally toothed gear is ellipsoidally flexed by the wave generator, and both ends of the ellipsoidally flexed flexible externally toothed gear along the major-axis direction mesh with the rigid internally toothed gear.

Since its invention by C. W. Musser (Patent Document 1), the strain wave gearing has been contrived in a variety of inventions and designs by many researchers including the present inventor, as well as Musser himself. There are even a variety of inventions related merely to the tooth profile of strain wave gearings. In Patent Document 2, the present inventor proposed using the basic tooth profile as an involute tooth profile, and in Patent Documents 3 and 4 proposed using a technique in which a rack is used to approximate the meshing of the teeth of a rigid internally toothed gear and a flexible externally toothed gear as a tooth-profile-designing method for deriving an addendum tooth profile for both gears, which have a large area of contact.

However, in cup-shaped and top-hat-shaped strain wave gearings, the degree of flexing along the tooth trace direction of the tooth parts of the ellipsoidally flexed flexible externally toothed gear, from the side of the diaphragm toward the leading end opening, varies substantially in proportion with respect to the distance from the diaphragm. Individual portions of the tooth parts of the flexible externally toothed gear undergo repeated radially outward and inward flexing as the wave generator rotates. Thus far, no rational method for setting the tooth profile in consideration of such flexing action (coning) of the externally toothed gear caused by the wave generator has been adequately considered.

In Patent Document 5, the present inventor proposed a strain wave gearing comprising a tooth profile that enabled continuous meshing in consideration of coning of the teeth. In the strain wave gearing proposed in Patent Document 5, a desired transverse cross-section of the flexible externally toothed gear in the tooth trace direction is taken as a main cross-section, and, in a position on the major axis of an ellipsoidal rim-neutral curve of the externally toothed gear in the main cross-section, the degree of flexing $2\kappa mn$ (where $\kappa$ is a flexing coefficient, m is a module, and n is a positive integer) with respect to a rim-neutral circle prior to flexing is set such that flexing occurs in a non-deflected state at $2mn$ ($\kappa=1$).

Rack meshing is used to approximate meshing between the externally toothed gear and the internally toothed gear, movement loci of the teeth of the externally toothed gear in relation to the teeth of the internally toothed gear accompanying rotation of the wave generator are determined in a transverse cross-section at each tooth-trace-direction position of the externally toothed gear that includes the main cross-section, and the basic tooth profile of the addenda of the internally toothed gear and the externally toothed gear is set by utilizing a curved portion from the apex point to the subsequent bottom point of a non-deflected movement locus obtained in the main cross-section.

In addition, in the tooth profile of the externally toothed gear, the tooth profile portions on both tooth-trace-direction sides of the main cross-section are modified so that negative-deflection movement loci obtained in transverse cross-sections that are closer to the diaphragm than is the main cross-section and in which flexing occurs in a negative-deflection state (flexing coefficient $\kappa<1$) and positive-deflection movement loci obtained in transverse cross-sections that are closer to the leading end opening than is the main cross-section and in which flexing occurs in a positive deflection state (flexing coefficient $\kappa>1$) describe curves that are tangent to each of the bottom and the apex of the non-deflected movement locus in the main cross-section.

In a strain wave gearing in which the tooth profile is formed in this manner, not only do the addendum tooth profiles of both the external teeth and the internal teeth continuously mesh across a wide area in the main cross-section of both gears, but it is also possible to achieve effective meshing of the addendum tooth profiles of both the external teeth and the internal teeth in the entire area along the tooth trace direction. Accordingly, it is possible to transmit a greater amount of torque than is possible with conventional strain wave gearings in which meshing occurs in a narrow tooth trace area.

PRIOR ART DOCUMENTS

Patent Documents

[Patent Document 1] U.S. Pat. No. 2,906,143
[Patent Document 2] JP-B 45-41171
[Patent Document 3] JP-A 63-115943
[Patent Document 4] JP-A 64-79448
[Patent Document 5] WO2010/070712

SUMMARY OF THE INVENTION

Problems to be Solved by the Invention

Currently, there is strong demand in markets for improved load torque performance in strain wave gearings. Achieving this in a flat strain wave gearing requires a rational tooth profile enabling root rim stress in the externally toothed gear to be reduced and enabling continuous meshing across a wide area of the addendum tooth profiles of both the external teeth and the internal teeth. Achieving improved load torque performance in a cup-shaped or top-hat-shaped strain wave gearing requires a rational tooth profile enabling root rim stress in the externally toothed gear to be reduced, enabling continuous meshing across a wide area of the addendum tooth profiles of both the external teeth and the internal teeth, and also enabling continuous meshing along the tooth trace direction in consideration of coning accompanying variations in the degree of flexing along the tooth trace of the external teeth.

An object of the present invention is to provide a strain wave gearing having a continuous-contact tooth profile that enables root rim stress in an externally toothed gear to be reduced and enables continuous meshing across a wide area.

Another object of the present invention is to provide a strain wave gearing having a three-dimensional continuous-contact tooth profile that enables root rim stress in an externally toothed gear to be reduced, and enables continuous meshing across a wide area in a prescribed transverse cross-section as well as continuous meshing in a direction along the tooth trace.

Means Used to Solve the Above-Mentioned Problems

In the strain wave gearing of the present invention, the addendum tooth profile of a rigid internally toothed gear is defined in a transverse cross-section of an externally toothed gear by an arcuate portion of a semicircle centered on the tooth ridge center line of the profile, an pressure angle of the arcuate portion being equal to or greater than a prescribed value, and a straight line connected to an end point of the arcuate portion (the straight line being a tangent drawn from the end point). The addendum tooth profile of the externally toothed gear is defined by a curve that is parallel to a curved portion in an area extending from the apex point to the bottom point of a movement locus of the external teeth with respect to the internal teeth, the parallel curve being set apart from the curved portion by a distance equal to the radius of curvature of the semicircle. Furthermore, the dedendum tooth profile of the internally toothed gear is shaped to be provided with a relief so as not to interfere with the addendum tooth profile of the externally toothed gear.

According to the present invention, it is possible to achieve continuous meshing of the addendum tooth profiles of both gears. It is possible to achieve a design such that the internally toothed gear and the externally toothed gear do not mesh in positions on the major axis of the ellipsoidally flexed externally toothed gear; therefore, it is possible to avoid producing undue stress in the root rim of the externally toothed gear as caused by the superposition of the stress of ellipsoidal deformation and the stress caused by tooth surface load at the positions on the major axis of the externally toothed gear. Accordingly, it is possible to increase the transmission torque capacity of the strain wave gearing.

In the cup-shaped or top-hat-shaped strain wave gearing of the present invention, the addendum tooth profile of a rigid internally toothed gear is defined in a transverse cross-section (main cross-section) of an opening end part of a flexible externally toothed gear by an arcuate portion of a semicircle centered on the tooth ridge center line of the profile, an pressure angle of the arcuate portion being equal to or greater than a prescribed value, and a straight line connected to an end point of the arcuate portion (the straight line being a tangent drawn from the end point). The addendum tooth profile of the externally toothed gear is defined in the main cross-section by a curve that is parallel to a curved portion in an area extending from the apex point to the bottom point of a movement locus of the external teeth with respect to the internal teeth, the parallel curve being set apart from the curved portion by a distance equal to the radius of curvature of the semicircle. Furthermore, the dedendum tooth profile of the internally toothed gear is shaped to be provided with a relief so as not to interfere with the addendum tooth profile of the externally toothed gear. In addition, in transverse cross-sections other than the main cross-section in the tooth trace direction of the external teeth, portions of the external teeth outside of the main cross-section are modified so that the movement loci of the external teeth with respect to the internal teeth are tangent to the bottom of the movement locus of the external teeth in the main cross-section.

According to the present invention, it is possible to achieve continuous meshing across a wide area of the addendum tooth profiles in the main cross-section. It is possible to achieve a design such that the internally toothed gear and the externally toothed gear do not mesh in positions on the major axis of the ellipsoidally flexed externally toothed gear; therefore, it is possible to avoid producing undue stress in the root rim of the externally toothed gear as caused by the superposition of the stress of ellipsoidal deformation and the stress caused by tooth surface load at the positions on the major axis of the externally toothed gear. In addition, the external teeth are modified at positions along the tooth trace direction in consideration of the effects of coning accompanying variations in the degree of flexing along the tooth trace of the external teeth. The teeth are thereby caused to mesh continuously in the tooth trace direction, and the tooth surface load is thereby dispersed across the entire tooth width. As a result, it is possible to achieve an improvement of the transmission torque capacity of the strain wave gearing.

BRIEF DESCRIPTION OF THE DRAWINGS

FIGS. 7(a), (b), and (c) are schematic views of the state of meshing with the internal teeth at the opening end part (main cross-section), the tooth-width central part, and the inner end part of the external teeth, respectively.

MODE FOR CARRYING OUT THE INVENTION (Configuration of Strain Wave Gearing)

Figure 1:
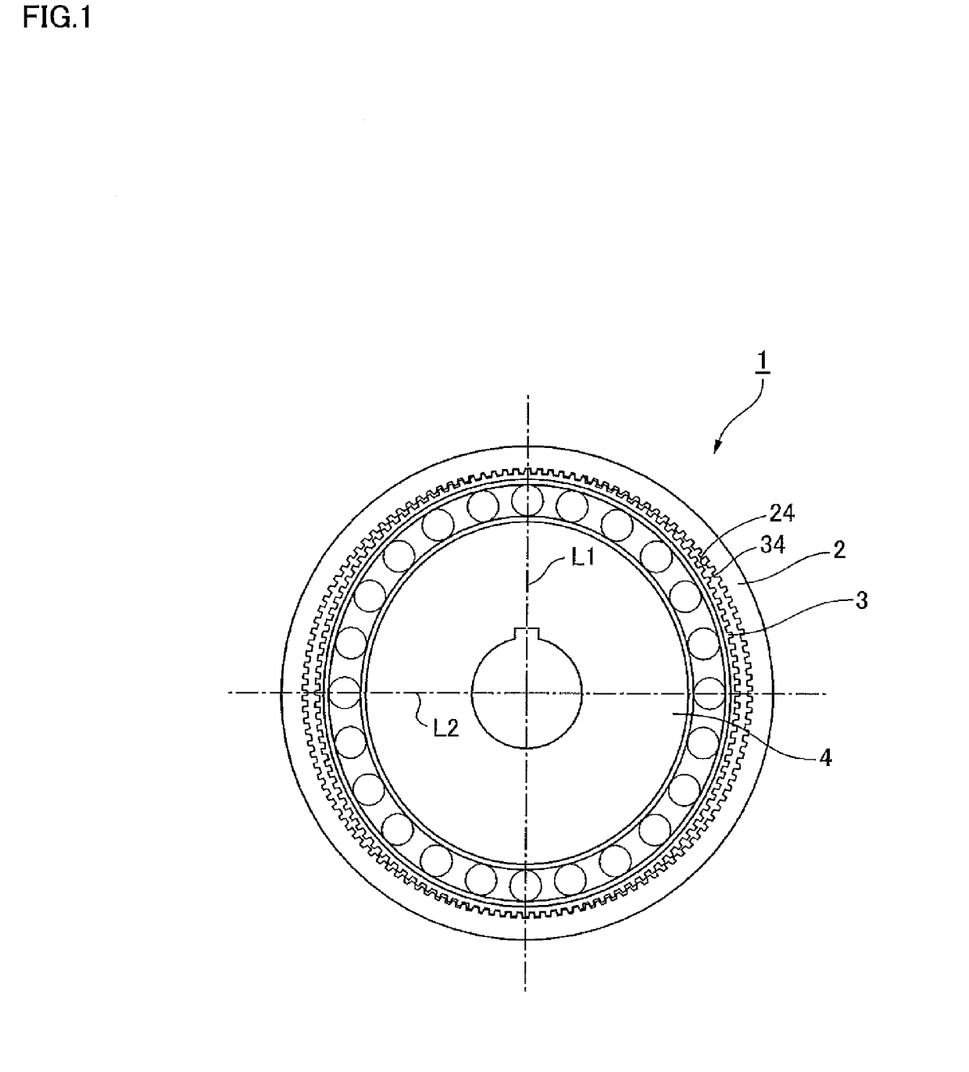
FIG. 1 is a schematic diagram of one example of a strain wave gearing to which the present invention has been applied.
Figure 2:
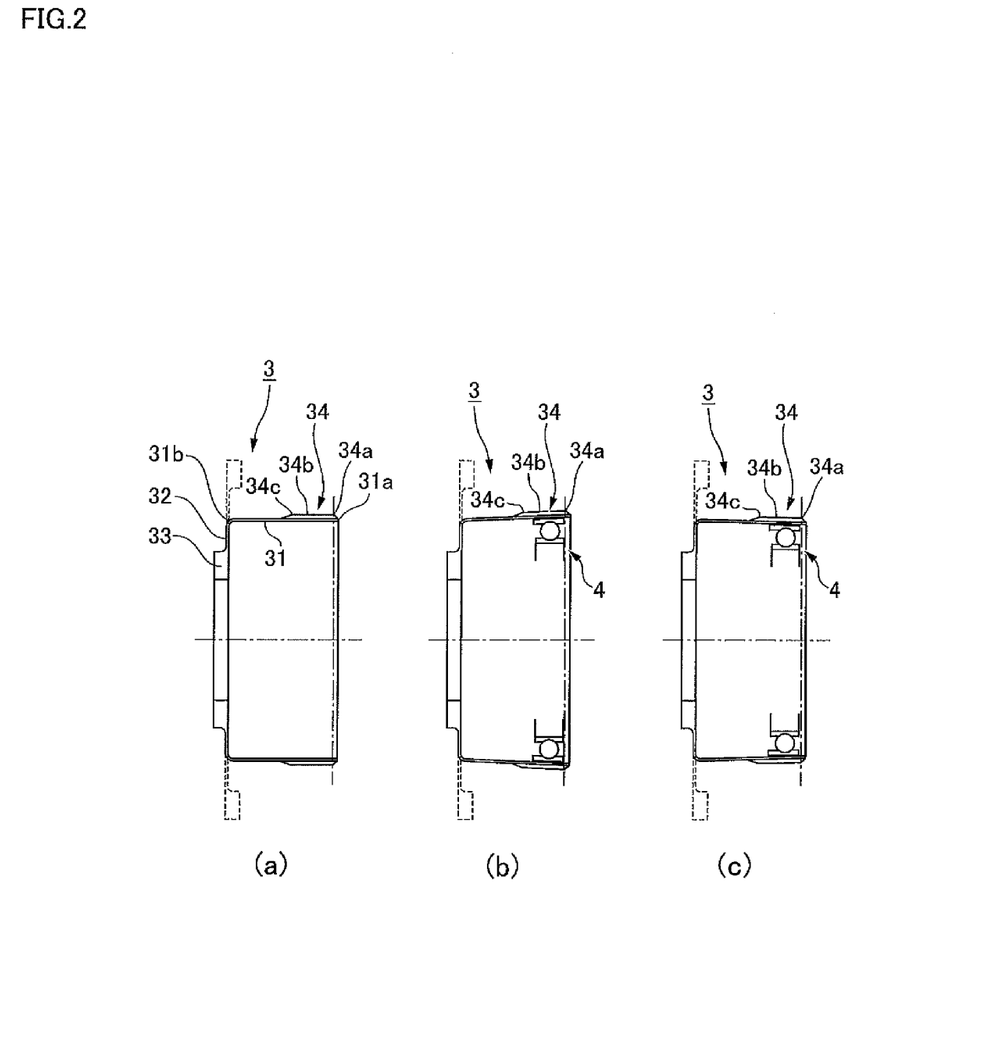
FIG. 2 is a schematic view of the condition of flexing of a cup-shaped or top-hat-shaped flexible externally toothed gear, where (a) shows a state prior to deformation, (b) shows the state of a cross-section that includes the major axis of the ellipsoidally deformed flexible externally toothed gear, and (c) shows the state of a cross-section that includes the minor axis of the ellipsoidally deformed flexible externally toothed gear.

FIG. 1 is a front view of a strain wave gearing to which the present invention has been applied. FIG. 2 is a schematic view for showing the condition of the flexible externally toothed gear of the strain wave gearing when the opening part of the flexible externally toothed gear is ellipsoidally flexed, where (a) shows a state prior to deformation, (b) shows a cross-section that includes the major axis of the ellipsoid after deformation, and (c) shows a cross-section that includes the minor axis of the ellipsoid after deformation. In FIGS. 2(a)-(c), solid lines indicate the diaphragm and boss portions of a cup-shaped flexible externally toothed gear, and dashed lines indicate the diaphragm and boss portions of a top-hat-shaped flexible externally toothed gear.

As shown in these drawings, the strain wave gearing 1 has a rigid annular internally toothed gear 2, a flexible externally toothed gear 3 disposed within the internally toothed gear 2, and a wave generator 4 fitted within the externally toothed gear 3 that has an ellipsoidal contour. The internally toothed gear 2, and the externally toothed gear 3 prior to deformation, are spur gears having module m. The difference in the number of teeth of the internally toothed gear 2 and the externally toothed gear 3 is 2n, where n is a positive integer. The externally toothed gear 3, which is initially circular, is flexed into an ellipsoidal shape by the wave generator 4, which has an ellipsoidal contour. The external teeth 34 of the externally toothed gear 3 mesh with the internal teeth 24 of the internally toothed gear 2 near both major-axis L1 end portions of the ellipsoidally flexed externally toothed gear 3.

When the wave generator 4 rotates, the positions in which both gears 2, 3 mesh move in the circumferential direction, and relative rotation is generated between both gears 2, 3 in accordance with the difference in the number of teeth of both gears. As shown in FIG. 2, the externally toothed gear 3 comprises a flexible cylindrical barrel part 31, a diaphragm 32 extending radially in continuation from the trailing end 31b of the cylindrical barrel part 31, a boss 33 continuing from the diaphragm 32, and external teeth 34 formed on the external circumferential surface portion of an opening end 31a, which is the other end of the cylindrical barrel part 31.

The ellipsoidally contoured wave generator 4 is fitted in the internal circumferential surface portion of the external-tooth-formed portion of the cylindrical barrel part 31. The degree of flexing of the cylindrical barrel part 31 toward the outside or the inside in the radial direction from the diaphragm-side trailing end 31b to the opening end 31a is gradually increased by the wave generator 4. The degree of flexing toward the outside in a cross-section that includes the major axis L1 (see FIG. 1) of the ellipsoidal curve gradually increases in proportion to the distance from the trailing end 31b to the opening end 31a, as shown in FIG. 2(b). The degree of flexing toward the inside in a cross-section that includes the minor axis L2 (see FIG. 1) of the ellipsoidal curve gradually increases in proportion to the distance from the trailing end 31b to the opening end 31a, as shown in FIG. 2(c). The degree of flexing of the external teeth 34 formed on the external circumferential surface portion near the opening end 31a from the tooth-trace-direction inner end part 34c toward the opening-side opening end part 34a also gradually increases in proportion to the distance from the trailing end 31b.

In a transverse cross-section at a desired position along the tooth trace direction of the external teeth 34, a circle passing through the root-rim-thickness-direction center of the external teeth prior to ellipsoidal flexing is a rim-neutral circle. A curve passing through the root-rim-thickness-direction center after ellipsoidal flexing is flexed ellipsoidally from the rim-neutral circle. This rim-neutral curve is referred to as an "ellipsoidal rim-neutral line." The degree of flexing w along the major-axis direction with respect to the rim-neutral circle at a major-axis L1 position on the ellipsoidal rim-neutral line is represented by $2\kappa nm$, where $\kappa$ is a real number including 1 and is referred to as a flexing coefficient. "Non-deflected flexing" refers to a case where $\kappa=1$, "positive deflection flexing" refers to a case where $\kappa>1$, and "negative deflection flexing" refers to a case where $\kappa<1$.

Specifically, the value ($mZ_F/R=2mn$) obtained by dividing the pitch diameter $mZ_F$ of the externally toothed gear 3 by a reduction ratio R is the degree of non-deflected flexing where $\kappa=1$ at a position on the major axis, where $Z_F$ is the number of external teeth 34 of the externally toothed gear 3, $Z_C$ is the number of internal teeth 24 of the internally toothed gear 2, and $R(=Z_F/(Z_C-Z_F)=Z_F/2n)$ is the reduction ratio of the strain wave gearing 1; this value is referred to as the normal (standard) degree of flexing $w_0$. Typically, the strain wave gearing 1 is designed to flex by the normal degree of flexing $w_0$ (=2mn) in regions in which the ball center of the wave bearing of the wave generator 4 is positioned along the tooth trace direction of the externally toothed gear 3. The flexing coefficient $\kappa$ represents a value obtained by dividing the degree of flexing w in each transverse cross-section along the tooth trace direction of the flexible externally toothed gear 3 by the normal degree of flexing.

In the strain wave gearing 1 of the present example, the tooth profile of the external teeth of the externally toothed gear 3 is set to a non-deflected tooth profile in which non-deflected flexing (degree of flexing $w=w_0=2mn$) where $\kappa=1$ is produced in a transverse cross-section in the opening end part 34a. Therefore, along the tooth trace direction of the external teeth, the tooth profile of the external teeth excluding the opening end part 34a is a negative deflection tooth profile in which negative deflection flexing where $\kappa<1$ is produced.

Figure 3:
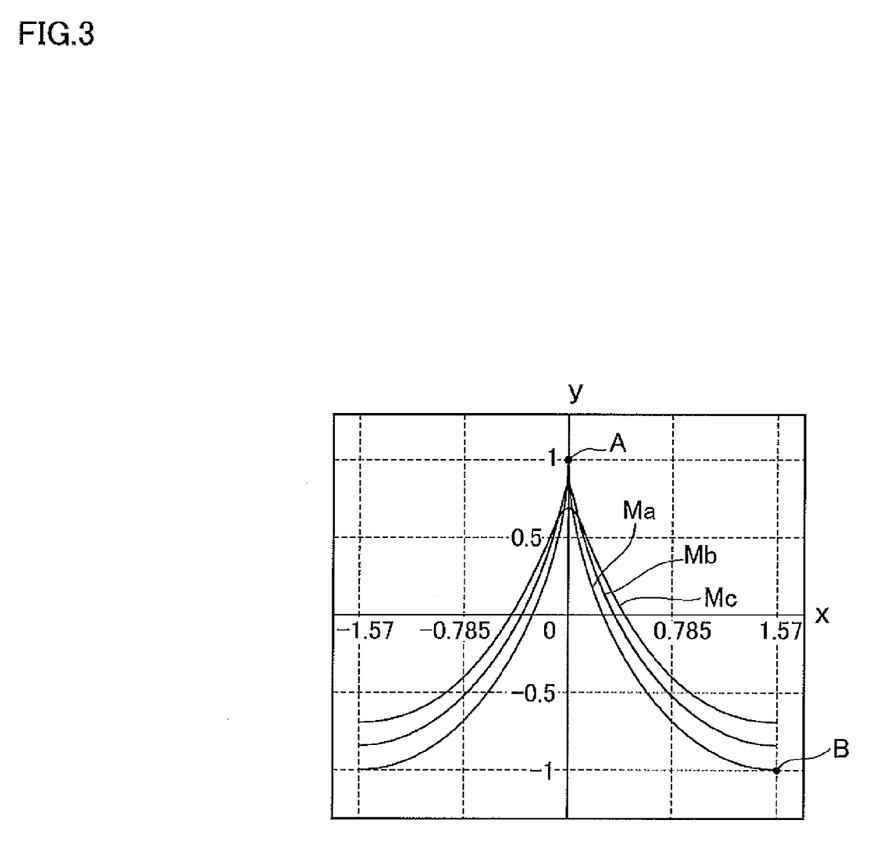
FIG. 3 is a graph of movement loci of the external teeth obtained when a rack is used to approximate the relative motions of the two gears at the opening end part (main cross-section), the tooth-width central part, and the inner end part in the tooth trace direction of the external teeth.

FIG. 3 is a graph of movement loci of the external teeth 34 of the externally toothed gear 3 with respect to the internal teeth 24 of the internally toothed gear 2, the movement loci being obtained when a rack is used to approximate the relative motions of the two gears 2, 3 of the strain wave gearing 1. In the graph, the x-axis shows the translation direction of the rack, and the y-axis shows the perpendicular direction of the rack. The origin of the y-axis is the average position of the amplitude of the movement loci. The curve Ma is obtained at the opening end part 34a (see FIG. 2) of the external teeth 34. The transverse cross-section of the opening end part 34a is referred to as a "main cross-section." The movement locus Ma of non-deflected flexing where the flexing coefficient $\kappa=1$ is obtained in the main cross-section 34a. The curve Mb is obtained at the tooth-width central part 34b (see FIG. 2) of the external teeth 34, and is a movement locus of negative deflection flexing where the flexing coefficient $\kappa<1$. Similarly, the curve Mc is obtained at the inner end part 34c (see FIG. 2) of the external teeth 34, and is a movement locus of negative deflection flexing where the flexing coefficient κ<1. The movement loci of the external teeth 34 of the externally toothed gear 3 with respect to the internal teeth 24 of the internally toothed gear 2 are expressed by the following formula.

$$x = 0.5mn(\theta - \kappa \sin \theta)$$

$$y = \kappa nm \cos \theta$$

For simplicity, the above formula is represented by formula 1 below when module m=1 and n=1 (difference in number of teeth 2n=2).

$$x = 0.5(\theta - \kappa \sin \theta)$$

$$y = \kappa \cos \theta \qquad \text{(Formula 1)}$$

(Shape of Tooth Profile in Main Cross-Section)

Figure 4A:
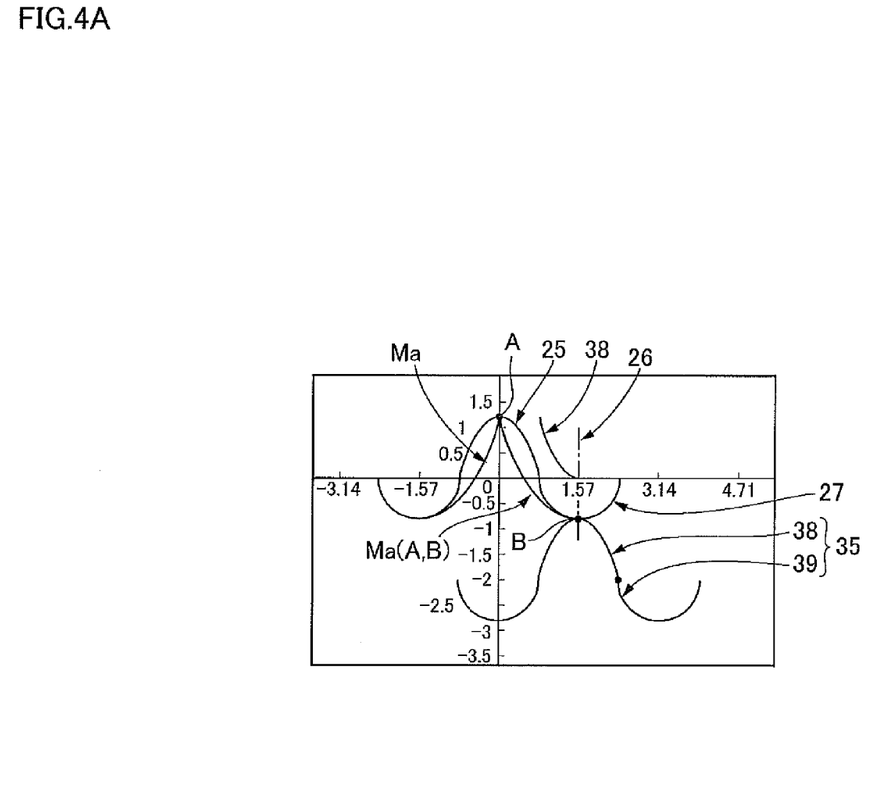
FIG. 4A is a graph of the tooth profiles of each of the two gears at the opening end part (main cross-section), the movement locus of the relative motions of the two gears, and a curve that is parallel to part of the movement locus.
Figure 4B:
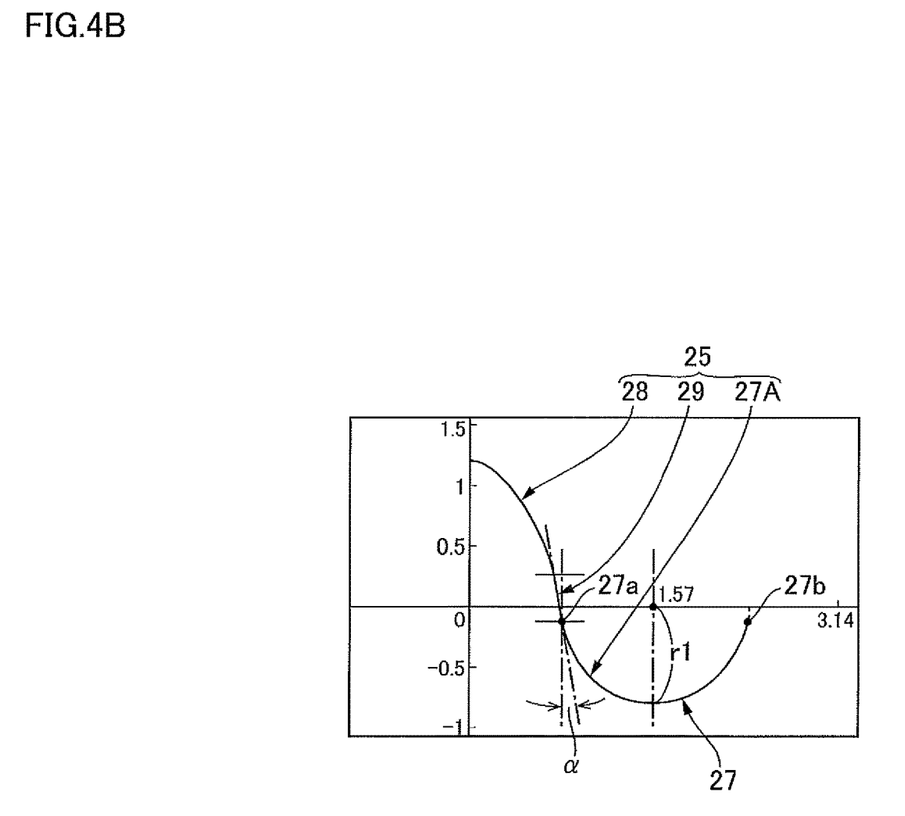
FIG. 4B is a graph of the tooth profile of the internally toothed gear in the main cross-section.

FIG. 4A is a schematic graph of the principle for forming the rack tooth profile of the external teeth 34 and the internal teeth 24 in the main cross-section 34a. The upper side of FIG. 4A shows the internal-tooth profile 25 and the non-deflected movement locus Ma obtained in the main cross-section 34a of the external teeth 34, as well as a curve 38 that is parallel to a curved portion that is part of the non-deflected movement locus Ma. The lower side of FIG. 4A shows the external-tooth profile 35 in the main cross-section 34a of the external teeth 34. The external-tooth profile 35 in the main cross-section 34a is referred to as the "external tooth base tooth profile 35." FIG. 4B is an enlarged schematic graph of the internal-tooth profile 25.

The internal-tooth profile 25 will be described with reference to FIGS. 4A and 4B. In the internal-tooth profile 25, the primary part of the addendum tooth profile (addendum tooth profile portion) is defined by an arcuate portion 27A of a semicircle 27 centered on the tooth ridge center line 26 of the profile of the internal teeth, where both end points 27a, 27b of the semicircle 27 are points at which the pressure angle α of the arcuate portion 27A is a prescribed angle. It is preferable to make the lower limit value for the pressure angle α as low as possible in order to expand the meshing area of the semicircular arc; however, due to the necessity of maintaining a relief angle for gear-cutting, the pressure angle α must be greater than 0°. If the upper limit value for the pressure angle α is too high, the area of the arcuate tooth profile which is effective for meshing could be reduced; therefore, from a practical standpoint, the upper limit value is preferably set equal to or less than 15°. Specifically, the pressure angle α preferably is of a value within the following range.

$$0° < \alpha \le 15°$$

The dedendum tooth profile of the internal-tooth profile 25 is defined by an appropriate concave curve 28 so as not to interfere with the addendum tooth profile of the external teeth 34. A straight-line tooth profile portion defined by a straight line 29 is formed between the arcuate portion 27A that defines the primary part of the addendum tooth profile and the concave curve 28 that defines the dedendum tooth profile.

As shall be apparent from FIG. 4B, the straight line 29 is defined by a tangent drawn from the end point 27a of the arcuate portion 27A, the tangent extending toward the dedendum. The end point 27a is set such that the pressure angle α of the straight line 29 drawn from the end point 27a is equal to or less than 15°, as described above.

Conversely, the primary part of the addendum tooth profile (addendum tooth profile portion) of the external tooth base tooth profile 35 in the main cross-section 34a of the external teeth 34 is defined as described below. In FIG. 4A, a curve 38 is formed that is parallel to a curved portion Ma (A, B) extending in a range from the apex point A to the subsequent bottom point B (where parameter θ in formula 1 described above is within a range from 0 to π) of the non-deflected movement locus Ma, as shown on the right side of the non-deflected movement locus Ma. The parallel curve 38 is set apart from the curved portion Ma (A, B) by a distance equal to the radius of curvature r1 of the arcuate portion 27A, which defines the primary part of the addendum tooth profile of the internal-tooth profile 25. The parallel curve 38 is used to define the primary part of the addendum tooth profile of the external tooth base tooth profile 35.

The dedendum tooth profile of the external-tooth profile 35 is defined by a concave curve 39 that is slightly larger than the arcuate portion 27A so that a very small clearance can be maintained in order to avoid interference with the addendum tooth profile defined by the straight line 29 and the arcuate portion 27A of the internal-tooth profile 25. Therefore, neither of the dedendum tooth profiles of the internal teeth 24 and external teeth 34 participates in meshing.

The radius of curvature r1 of the arcuate portion 27A that defines the addendum tooth profile portion of the internal teeth 24 (the depth of the addenda of the external teeth 24), as well as the ratio of the depths of the addenda of the externally toothed gear and internally toothed gear, are preferably set as described below.

In order to minimize bending stress produced in the strain wave gearing by the ellipsoidal deformation of the externally toothed gear, the tooth groove width of the externally toothed gear is preferably slightly larger than the tooth thickness. In this case, the ratio of the tooth thicknesses of the two gears on an average line (pitch line) of the movement locus Ma is not 1:1, and the tooth thickness of the externally toothed gear is less than that of the internally toothed gear. From a practical standpoint, the limit on the tooth thickness ratio of the internally toothed gear and the externally toothed gear is approximately 3:2. Therefore, the tooth thickness ratio of the internally toothed gear and the externally toothed gear is set to 1:1-3:2.

The radius of curvature r1 of the arcuate portion 27A is equal to half of the tooth thickness on the pitch line of the internally toothed gear; therefore, the radius of curvature r1 may be set within a range of 0.5-0.6 times half the pitch (0.5 πm) of the internally toothed gear, i.e., to 0.785-0.942 times the module m.

The radius of curvature r1 of the arcuate portion 27A is equal to the depth of the addenda of the internally toothed gear; therefore, when the radius of curvature r1 is set as described above, the ratio of the depths of the addenda of the externally toothed gear and internally toothed gear is equal to or greater than 1. Specifically, the total amplitude of the non-deflected movement locus Ma is 2m, and the sum of the depths of the addenda of the two gears is equal to the total amplitude 2m of the movement locus Ma. Accordingly, the theoretical depth of the addenda of the externally toothed gear is a value obtained by subtracting the tooth depth of the addenda of the internally toothed gear from the amplitude 2m, and thus is equal to 1.215-1.058 times the module m. Specifically, the ratio of the depths of the addenda of the externally toothed gear and internally toothed gear is greater than 1. This makes it possible to make the tooth groove width of the externally toothed gear greater than the tooth thickness, and to reduce bending stress. Accordingly, although it is possible to set the ratio of the depths of the addenda of the externally toothed gear and internally toothed gear to 1, this ratio is preferably set to a value greater than 1.

(Shape of Tooth Profile of External Teeth at Positions Outside Main Cross-Section)

The tooth profile of the external teeth 34 of the externally toothed gear 3 is modified in accordance with the value of the flexing coefficient κ from the main cross-section 34a to the inner end part 34c. When mnh is the degree of modification to the tooth profile of the external teeth 34, the degree of modification is h when m=1 and n=1. The main cross-section 34a contains no deflection, and the flexing coefficient κ=1 therein. The degree of modification h at each position in the tooth trace direction of the modified tooth profile is expressed by the following formula (2).

$$h=1-\kappa \qquad \text{(Formula 2)}$$

Figure 5:
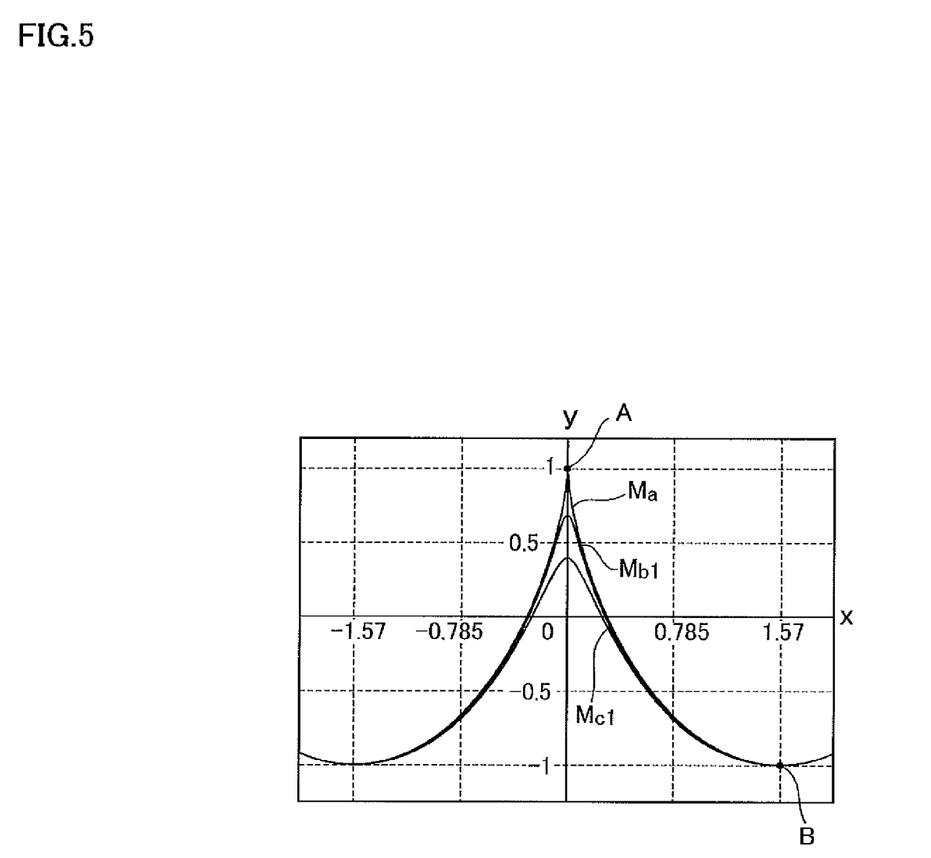
FIG. 5 is a graph of movement loci of the external teeth obtained when a rack is used to approximate the relative motions of the two gears at the opening end part (main cross-section) in the tooth trace direction of the external teeth and at the tooth-width central part and inner end part of the modified teeth.

FIG. 5 is a graph of the movement locus of the main cross-section 34a of the external teeth 34, and the movement loci of the tooth-width central part 34b and inner end part 34c of the external teeth 34 modified as described above. Modifying the external tooth base tooth profile 35 as described above changes the movement locus Mb of the tooth-width central part 34b and the movement locus Mc of the inner end part 34c shown in FIG. 3 to the movement loci Mb1, Mc1 shown in FIG. 5, respectively. Specifically, the bottom of the movement loci at each position on the external teeth 34 are tangent to (coincide with) the bottom of the movement locus Ma in the main cross-section 34a.

Figure 6:
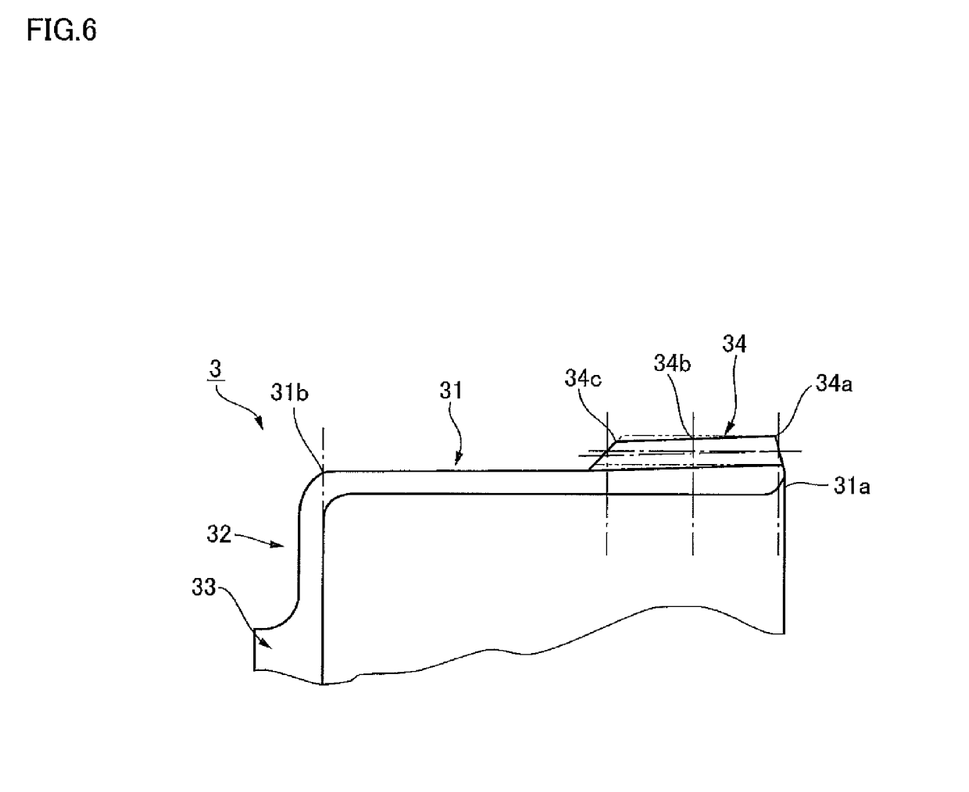
FIG. 6 is a schematic view of an example of the tooth-trace-direction contour of the modified external teeth.

FIG. 6 is a schematic view of the tooth-trace-direction contour of the external teeth 34 resulting from this modification.

Thus, the tooth profile outside the main cross-section 34a of the externally toothed gear 3 is modified, with respect to the external tooth base tooth profile 35 in the main cross-section, by the degree of modification h provided by formula 2 above to form a modified tooth profile. As a result, the tooth profiles approximately coincide near the bottom of the movement loci; therefore, the external teeth 34 continuously mesh with the addendum tooth profile of the internal teeth 24, not only in the main cross-section 34a but also in each of the transverse cross-sections along the tooth trace direction.

FIGS. 7(a), (b), and (c) are schematic views of cases in which a rack is used to approximate the aspect of meshing in the internal teeth 24 and external teeth 34 set as described above. FIG. 7(a) shows the state of meshing in the main cross-section 34a, FIG. 7(b) shows the state of meshing at the tooth-width central part 34b, and FIG. 7(c) shows the state of meshing at the inner end part 34c. It shall be apparent from these drawings that meshing of the internal and external teeth is obtained over the entirety of the tooth trace of the external teeth.

Figure 7:
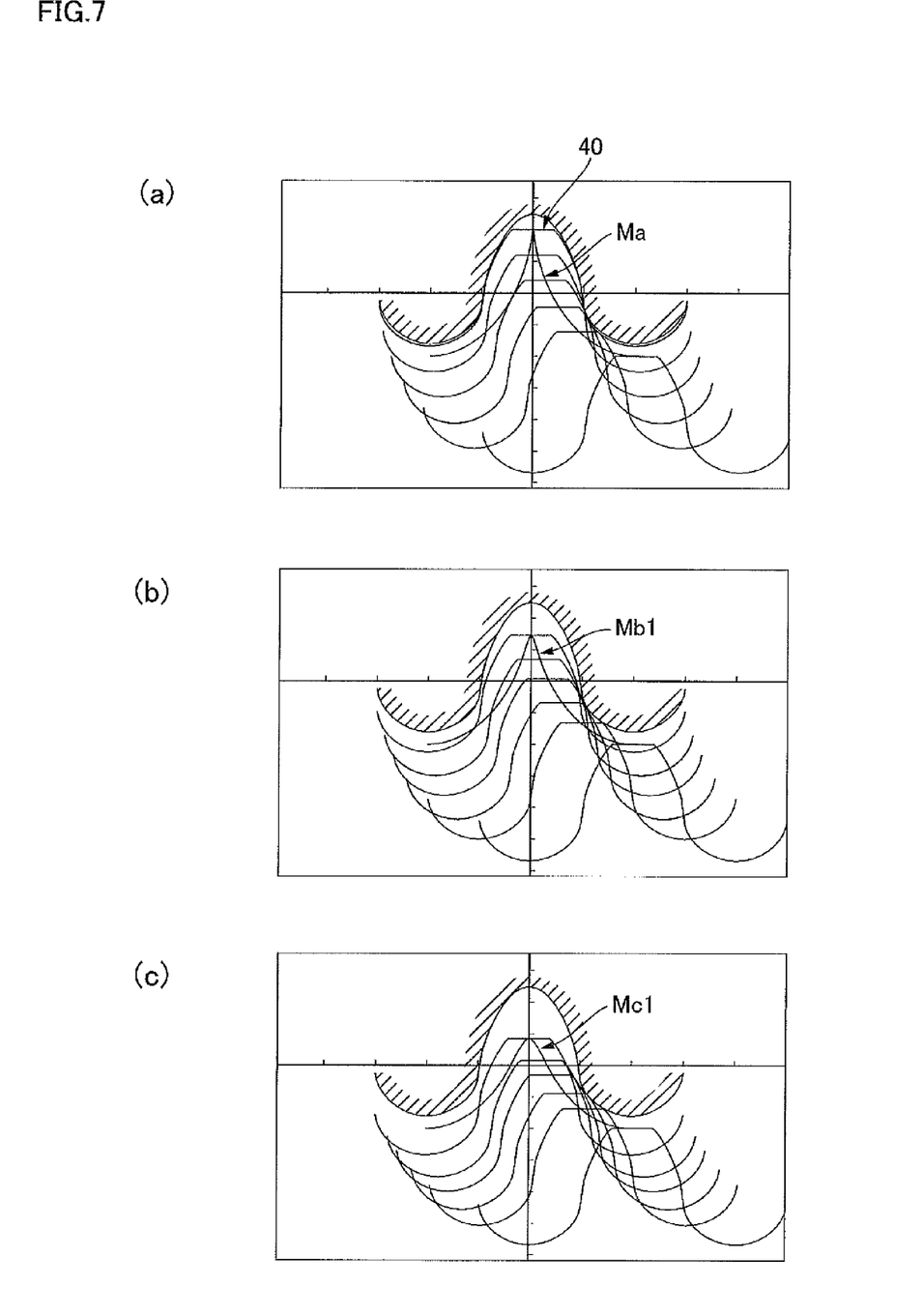

The tooth profile of the addenda of the external teeth 34 as shown in FIG. 7 comprises a flat top land 40 in order to maintain the clearance relative to the internal teeth. The top land 40 is formed by removing part of the top of the external-tooth profile set as described above.

As described above, the addendum tooth profile of the internal teeth 24 in the strain wave gearing 1 is shaped such that the straight line 29 passes through the arcuate portion 27A. The dedendum tooth profile of the internal teeth 24 is shaped to be provided with a relief so as not to interfere with the addendum tooth profile of the external teeth 34. This makes it possible to achieve, in the main cross-section, continuous meshing of the addendum tooth profiles of both gears. In addition, it is possible to achieve a design such that the internally toothed gear 2 and the externally toothed gear 3 do not mesh in positions nearest the major axis of the ellipsoidally flexed externally toothed gear 3. As a result, it is possible to avoid producing undue stress in the rim of the external teeth 34 as caused by the superposition of the stress of ellipsoidal deformation and the stress caused by tooth surface load at the positions on the major axis of the externally toothed gear 3. Furthermore, it is possible to achieve continuous meshing of the teeth in the tooth trace direction of the external teeth 34, and to disperse the tooth surface load across the entire tooth trace direction. These synergistic effects make it possible to increase the torque capacity of the strain wave gearing 1.

Other Embodiments

The description given above relates to an example in which the present invention was applied to a cup-shaped strain wave gearing comprising a cup-shaped externally toothed gear and a top-hat-shaped strain wave gearing comprising a top-hat-shaped externally toothed gear. The present invention can also be applied to a flat strain wave gearing provided with two rigid internally toothed gears, a cylindrical externally toothed gear capable of meshing with the internally toothed gears, and a wave generator for causing the externally toothed gear to flex ellipsoidally and mesh with each of the internally toothed gears. In this case, the tooth profile of the externally toothed gear may be shaped to have the base tooth profile described above along the tooth trace direction of the externally toothed gear.

The invention claimed is:

1. A strain wave gearing comprising a rigid internally toothed gear, a flexible externally toothed gear disposed coaxially within the internally toothed gear, and a wave generator fitted within the externally toothed gear, wherein the externally toothed gear is ellipsoidally flexed by the wave generator, and external teeth of the ellipsoidally flexed externally toothed gear mesh with internal teeth of the internally toothed gear at both end positions along a major axis of the ellipsoidally flexed externally toothed gear;

the internally toothed gear and the externally toothed gear are spur gears having module m;

the number of teeth of the externally toothed gear is 2n less than the number of teeth of the internally toothed gear, where n is a positive integer;

taking a transverse cross-section at a prescribed position along a tooth trace direction of the external teeth as a main cross-section, a degree of flexing, with respect to a rim-neutral circle of the externally toothed gear prior to ellipsoidal flexing, of a rim-neutral line of the ellipsoidally flexed externally toothed gear is set, at a position on the major axis in the main cross-section, to 2mn;

an addendum tooth profile of the internal teeth is defined by an arcuate portion of a semicircle centered on a tooth ridge center line of a profile of the internal teeth, a pressure angle of the arcuate portion being equal to or greater than a prescribed value, and a tangent extending toward a dedendum from an endpoint of the arcuate portion, the tangent being of prescribed length drawn from the endpoint of the arcuate portion;

taking a tooth profile of the external teeth in the main cross-section as a base tooth profile of the external teeth, an addendum tooth profile of the base tooth profile is defined by a curve that is parallel to a curved portion in a prescribed area of a movement locus of the external teeth, the parallel curve being set apart from the curved portion by a distance equal to a radius of curvature of the semicircle;

a movement locus of the external teeth with respect to the internal teeth is obtained when rack meshing is used to approximate the meshing of the external teeth with the internal teeth accompanying rotation of the wave generator; and the curved portion of the movement locus is within an area extending from an apex point to a subsequent bottom point of the movement locus.

2. The strain wave gearing according to claim 1, wherein $0°<\alpha°\leq 15°$, where a is a prescribed value for the pressure angle of the arcuate portion.

3. The strain wave gearing according to claim 1, wherein a dedendum tooth profile of the internal teeth is defined by a concave curve connected to an dedendum-side endpoint of the tangent;

a dedendum tooth profile of the base tooth profile of the external teeth is defined by a concave curve connected to a dedendum-side endpoint of the parallel curve;

the concave curve that defines the dedendum tooth profile of the internal teeth is set so as not to interfere with the addendum tooth profile of the base tooth profile of the external teeth; and the concave curve that defines the dedendum tooth profile portion of the external teeth is set so as not to interfere with the addendum tooth profile of the internal teeth.

4. The strain wave gearing according to claim 1, wherein a ratio of depths of the addenda between the base tooth profile of the external teeth and the tooth profile of the internal teeth is equal to or greater than 1.

5. The strain wave gearing according to claim 3, wherein a prescribed amount of a top part of the base tooth profile of the external teeth is eliminated so as to leave a desired clearance relative to the dedendum tooth profile portion of the internal teeth.

6. The strain wave gearing according to claim 1, wherein the externally toothed gear comprises a radially flexible cylindrical barrel part, and a diaphragm extending radially inward or outward from a trailing end of the cylindrical barrel part, the external teeth being formed on an outer-peripheral surface portion of the cylindrical barrel part on a side of a leading end opening thereof;

a degree of flexing along a tooth trace direction of the external teeth, from an inner end on the diaphragm side toward an opening end part on the leading end opening side, varies in proportion with respect to a distance from the diaphragm;

a degree of flexing in transverse cross-sections along the tooth trace direction of the external teeth is 2mn or less;

the main cross-section in which the degree of flexing is 2mn is a transverse cross-section of the opening end part of the external teeth;

a tooth profile in transverse cross-sections other than the main cross-section in the tooth trace direction of the external teeth is a modified tooth profile obtained by modifying the base tooth profile in the main cross-section; and the modified tooth profile is obtained by modifying the base tooth profile such that the movement locus of the modified tooth profile is tangent to a bottom of the movement locus of the base tooth profile in the main cross-section.

7. The strain wave gearing according to claim 2, wherein the externally toothed gear comprises a radially flexible cylindrical barrel part, and a diaphragm extending radially inward or outward from a trailing end of the cylindrical barrel part, the external teeth being formed on an outer-peripheral surface portion of the cylindrical barrel part on a side of a leading end opening thereof;

a degree of flexing along a tooth trace direction of the external teeth, from an inner end on the diaphragm side toward an opening end part on the leading end opening side, varies in proportion with respect to a distance from the diaphragm;

a degree of flexing in transverse cross-sections along the tooth trace direction of the external teeth is 2mn or less;

the main cross-section in which the degree of flexing is 2mn is a transverse cross-section of the opening end part of the external teeth;

a tooth profile in transverse cross-sections other than the main cross-section in the tooth trace direction of the external teeth is a modified tooth profile obtained by modifying the base tooth profile in the main cross-section; and the modified tooth profile is obtained by modifying the base tooth profile such that the movement locus of the modified tooth profile is tangent to a bottom of the movement locus of the base tooth profile in the main cross-section.

8. The strain wave gearing according to claim 3, wherein the externally toothed gear comprises a radially flexible cylindrical barrel part, and a diaphragm extending radially inward or outward from a trailing end of the cylindrical barrel part, the external teeth being formed on an outer-peripheral surface portion of the cylindrical barrel part on a side of a leading end opening thereof;

a degree of flexing along a tooth trace direction of the external teeth, from an inner end on the diaphragm side toward an opening end part on the leading end opening side, varies in proportion with respect to a distance from the diaphragm;

a degree of flexing in transverse cross-sections along the tooth trace direction of the external teeth is 2mn or less;

the main cross-section in which the degree of flexing is 2mn is a transverse cross-section of the opening end part of the external teeth;

a tooth profile in transverse cross-sections other than the main cross-section in the tooth trace direction of the external teeth is a modified tooth profile obtained by modifying the base tooth profile in the main cross-section; and the modified tooth profile is obtained by modifying the base tooth profile such that the movement locus of the modified tooth profile is tangent to a bottom of the movement locus of the base tooth profile in the main cross-section.

9. The strain wave gearing according to claim 4, wherein the externally toothed gear comprises a radially flexible cylindrical barrel part, and a diaphragm extending radially inward or outward from a trailing end of the cylindrical barrel part, the external teeth being formed on an outer-peripheral surface portion of the cylindrical barrel part on a side of a leading end opening thereof;

a degree of flexing along a tooth trace direction of the external teeth, from an inner end on the diaphragm side toward an opening end part on the leading end opening side, varies in proportion with respect to a distance from the diaphragm;

a degree of flexing in transverse cross-sections along the tooth trace direction of the external teeth is 2mn or less;

the main cross-section in which the degree of flexing is 2mn is a transverse cross-section of the opening end part of the external teeth;

a tooth profile in transverse cross-sections other than the main cross-section in the tooth trace direction of the external teeth is a modified tooth profile obtained by modifying the base tooth profile in the main cross-section; and the modified tooth profile is obtained by modifying the base tooth profile such that the movement locus of the modified tooth profile is tangent to a bottom of the movement locus of the base tooth profile in the main cross-section.

10. The strain wave gearing according to claim 5, wherein the externally toothed gear comprises a radially flexible cylindrical barrel part, and a diaphragm extending radially inward or outward from a trailing end of the cylindrical barrel part, the external teeth being formed on an outer-peripheral surface portion of the cylindrical barrel part on a side of a leading end opening thereof;

a degree of flexing along a tooth trace direction of the external teeth, from an inner end on the diaphragm side toward an opening end part on the leading end opening side, varies in proportion with respect to a distance from the diaphragm;

a degree of flexing in transverse cross-sections along the tooth trace direction of the external teeth is 2mn or less;

the main cross-section in which the degree of flexing is 2mn is a transverse cross-section of the opening end part of the external teeth;

a tooth profile in transverse cross-sections other than the main cross-section in the tooth trace direction of the external teeth is a modified tooth profile obtained by modifying the base tooth profile in the main cross-section; and the modified tooth profile is obtained by modifying the base tooth profile such that the movement locus of the modified tooth profile is tangent to a bottom of the movement locus of the base tooth profile in the main cross-section.

\* \* \* \* \*